US012596348B2

(12) United States Patent
Steinbach et al.

(10) Patent No.: US 12,596,348 B2
(45) Date of Patent: Apr. 7, 2026

(54) SOURCE TO TARGET TRANSLATION FOR MANUFACTURING

(71) Applicant: SAP SE, Walldorf (DE)

(72) Inventors: Jochen Steinbach, Bad Schoenborn (DE); Alexander Skorokhodov, Kyiv (UA); Sven-Eric Eigemann, Sandhausen (DE); Georg Henneboel, Wiesloch (DE); Nikhil Javaraju, Walldorf (DE); Elise Rudolf, Ladenburg (DE)

(73) Assignee: SAP SE, Walldorf (DE)

( * ) Notice: Subject to any disclaimer, the term of this patent is extended or adjusted under 35 U.S.C. 154(b) by 702 days.

(21) Appl. No.: 18/082,349

(22) Filed: Dec. 15, 2022

(65) Prior Publication Data

US 2024/0118674 A1 Apr. 11, 2024

Related U.S. Application Data

(60) Provisional application No. 63/415,006, filed on Oct. 11, 2022.

(51) Int. Cl.
*G05B 19/4093* (2006.01)

(52) U.S. Cl.
CPC .................. *G05B 19/40931* (2013.01); *G05B 2219/31053* (2013.01); *G05B 2219/36324* (2013.01)

(58) Field of Classification Search
None
See application file for complete search history.

(56) References Cited

U.S. PATENT DOCUMENTS

| | | | | |
|---|---|---|---|---|
| 9,720,652 B2 * | 8/2017 | Woodward | ............... | G06F 8/20 |
| 10,739,865 B2 * | 8/2020 | Kramer | ................ | G06F 3/0346 |
| 11,243,510 B2 * | 2/2022 | Kim | ................... | G05B 19/4155 |
| 11,321,508 B2 * | 5/2022 | Harris | ................... | B29C 64/393 |
| 2005/0114829 A1 * | 5/2005 | Robin | ................... | G06Q 10/06 |
| | | | | 717/101 |

(Continued)

OTHER PUBLICATIONS

Bachinger, Florian, Continuous improvement and adaptation of predictive models in smart manufacturing and model management, Mar. 23, 2021, The Institution of Engineering and Technology, https://ietresearch.onlinelibrary.wiley.com/doi/10.1049/cim2.12009, p. (Year: 2021).*

*Primary Examiner* — Joseph M Waesco
(74) *Attorney, Agent, or Firm* — Fountainhead Law Group, PC

(57) ABSTRACT

Computer-readable media, methods, and systems are disclosed for facilitating source to target translation and synchronization of production details for manufacturing of one or more production articles. A plurality of versioned technical design inputs in structured and unstructured formats is received. A plurality of translation inputs corresponding to one or more parameters associated with the plurality of versioned technical design inputs is received. A mapping of the plurality of versioned technical design inputs to a plurality of manufacturing data elements associated with one or more data models of a manufacturing system is automatically generated, based on the plurality of translation inputs. Finally, a plurality of manufacturing routings for implementing production of the one or more production articles is generated.

20 Claims, 6 Drawing Sheets

350

(56)          References Cited

U.S. PATENT DOCUMENTS

| | | | |
|---|---|---|---|
| 2011/0302550 A1* | 12/2011 | Jackson | G06F 30/30 |
| | | | 717/104 |
| 2015/0058052 A1* | 2/2015 | Kohlhoff | G06Q 10/0631 |
| | | | 705/29 |
| 2017/0293473 A1* | 10/2017 | Woodward | G06F 8/71 |
| 2018/0329906 A1* | 11/2018 | Byers | G06F 16/95 |
| 2021/0294577 A1* | 9/2021 | Dunn | G06F 8/33 |
| 2021/0365007 A1* | 11/2021 | Kim | G05B 19/4155 |
| 2021/0406412 A1* | 12/2021 | Cramer | G06F 30/20 |
| 2023/0206180 A1* | 6/2023 | Stump | G06Q 10/067 |
| | | | 717/103 |
| 2023/0324894 A1* | 10/2023 | Stump | G05B 19/41885 |
| | | | 703/6 |
| 2025/0117223 A1* | 4/2025 | Skadron | G06F 9/3814 |

* cited by examiner

Figure 3B:
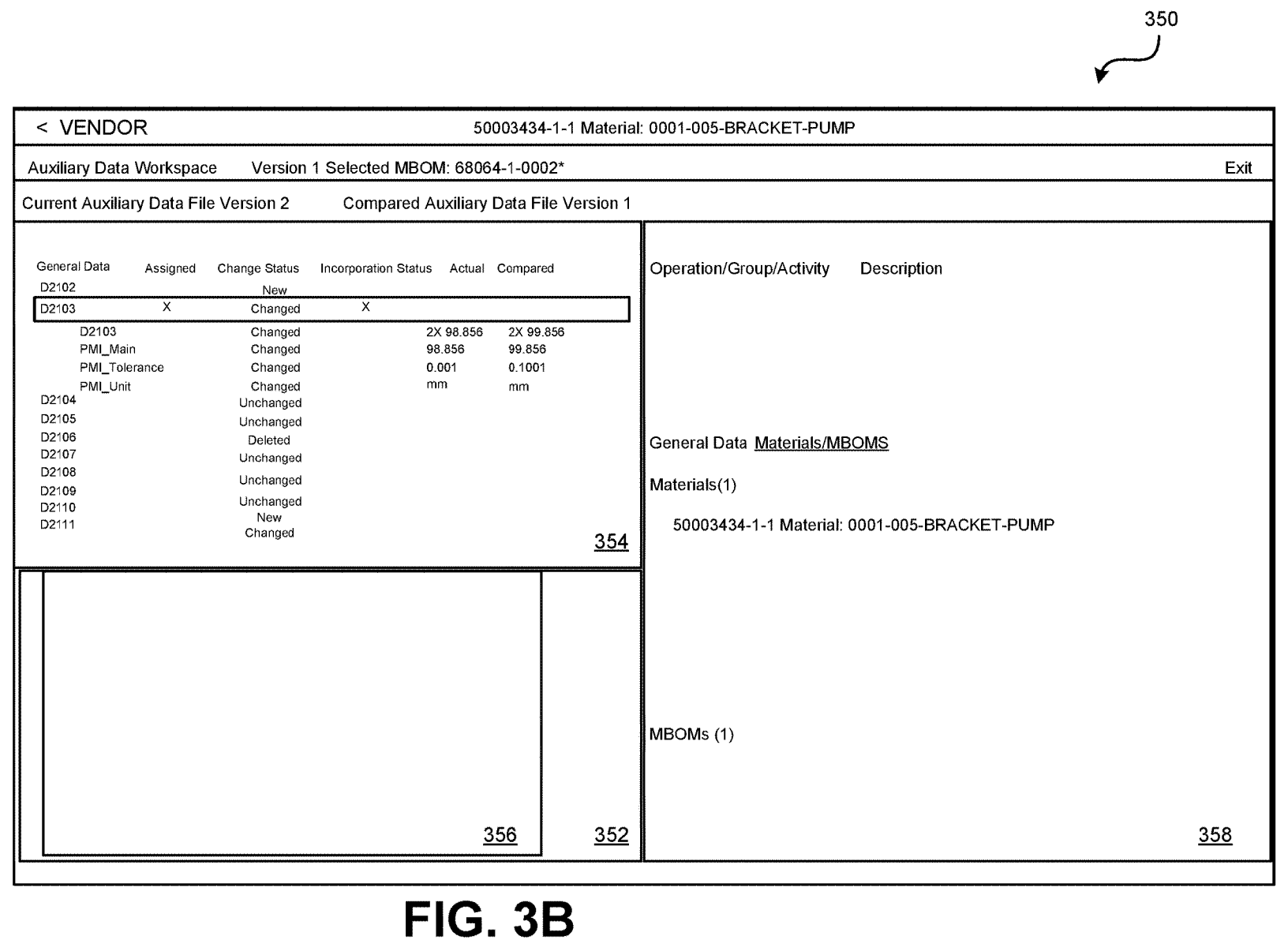

350

< VENDOR    50003434-1-1 Material: 0001-005-BRACKET-PUMP    Exit

Auxiliary Data Workspace    Version 1 Selected MBOM: 68064-1-0002*

Current Auxiliary Data File Version 2    Compared Auxiliary Data File Version 1

| General Data | Assigned | Change Status | Incorporation Status | Actual | Compared |
|---|---|---|---|---|---|
| D2102 | | New | | | |
| D2103 | X | Changed | X | | |
| PMI_Main | | Changed | | 2X 98.856 | 2X 99.856 |
| PMI_Tolerance | | Changed | | 98.856 | 99.856 |
| PMI_Unit | | Changed | | 0.001 | 0.1001 |
| | | | | mm | mm |
| D2104 | | Changed | | | |
| D2105 | | Unchanged | | | |
| D2106 | | Unchanged | | | |
| D2107 | | Deleted | | | |
| D2108 | | Unchanged | | | |
| D2109 | | Unchanged | | | |
| D2110 | | New | | | |
| D2111 | | Changed | | | |

354

Operation/Group/Activity    Description

General Data  Materials/MBOMS

Materials(1)

50003434-1-1 Material: 0001-005-BRACKET-PUMP

MBOMs (1)

RECEIVE VERSIONED TECHNICAL
DESIGN INPUTS

404

RECEIVE TRANSLATION INPUTS

406

GENERATE MAPPING OF DESIGN
INPUTS TO MANUFACTURING
DATA ELEMENTS

408

GENERATE MANUFACTURING
ROUTINGS

SOURCE TO TARGET TRANSLATION FOR MANUFACTURING

The present application claims the benefit and priority of U.S. Provisional Application No. 63/415,006, filed Oct. 11, 2022, entitled "SOURCE TO TARGET TRANSLATION FOR PRODUCTION ENGINEERING," the entire contents of which are incorporated herein by reference in its entirety for all purposes.

TECHNICAL FIELD

Embodiments generally relate to translating and synchronizing details for manufacturing of one or more production articles and more specifically mechanisms for facilitating source to target translation and synchronization of production details for manufacturing of one or more production articles.

Collaboration between different manufacturing systems involves various challenges, not the least of which relates to objects in different manufacturing source systems having significantly different semantics and structure with respect to how manufacturing parameters are specified. Moreover, manufacturing source systems are in many cases defined for different purposes. Nevertheless, manufacturing source objects, themselves frequently contain useful information which should be considered in the processes of an external system to facilitate manufacturing of particular articles over the production lifecycle of associated new versions of the articles. Because of these differences in semantics and structure, an end user is currently faced with the options of either synchronizing divergent objects manually or investing in expensive one-off integrations, which integrations generally need to be adapted every time there is a change to specifics or versions of semantics of the objects in either source or target manufacturing systems.

Accordingly, what is needed is a mechanism for facilitating source to target translation and synchronization of production details for manufacturing of one or more production articles that overcomes the above-described problems and challenges.

SUMMARY

Disclosed embodiments address the above-mentioned problems by providing one or more non-transitory computer-readable media storing computer-executable instructions that, when executed by a processor, perform a method for facilitating source to target translation and synchronization of production details for manufacturing of one or more production articles, the method comprising: receiving a plurality of versioned technical design inputs in structured and unstructured formats, receiving a plurality of translation inputs corresponding to one or more parameters associated with the plurality of versioned technical design inputs, automatically generating a mapping of the plurality of versioned technical design inputs to a plurality of manufacturing data elements associated with one or more data models of a manufacturing system, based on the plurality of translation inputs, and generating a plurality of manufacturing routings for implementing production of the one or more production articles.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present teachings will be apparent from the following detailed description of the embodiments and the accompanying drawing figures.

BRIEF DESCRIPTION OF THE DRAWING FIGURES

Embodiments are described in detail below with reference to the attached drawing figures, wherein:

FIG. 3B shows an example user interface illustration for implementing change management and change impact analysis for a product integration portal.

Figure 1:
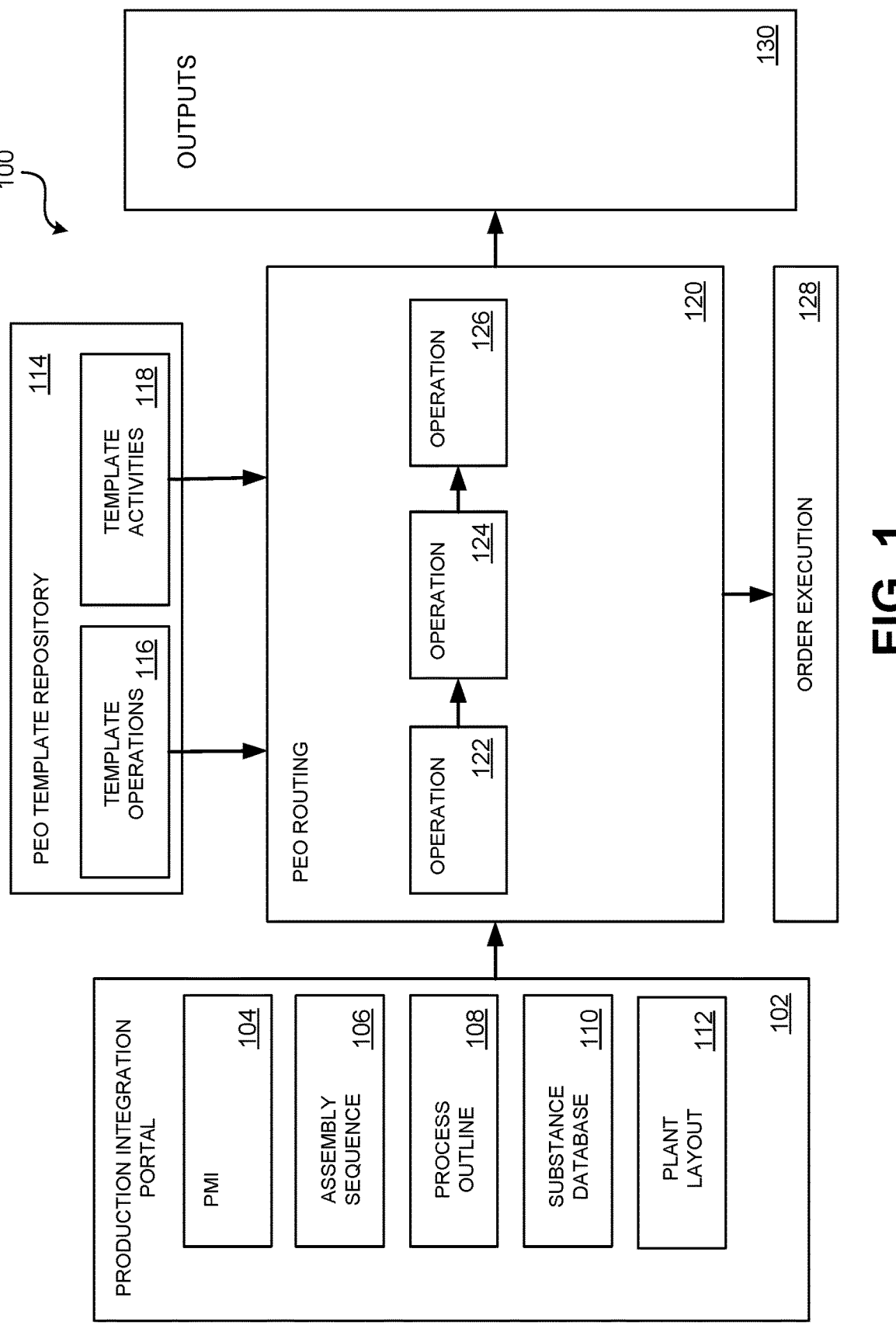
FIG. 1 is a system diagram illustrating facilitating source to target translation and synchronization of production details for manufacturing of one or more production articles consistent with the present teachings.

The drawing figures do not limit the present teachings to the specific embodiments disclosed and described herein. The drawings are not necessarily to scale, emphasis instead being placed upon clearly illustrating the principles of the disclosure.

DETAILED DESCRIPTION

The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the present teachings in sufficient detail to enable those skilled in the art to practice the present teachings. Other embodiments can be utilized, and changes can be made without departing from the claims. The following detailed description is, therefore, not to be taken in a limiting sense. The scope of embodiments is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

OVERVIEW

The present teachings describe methods and systems to facilitate integrating manufacturing systems by way of a production integration portal (PIP) that may be integrated with various manufacturing systems and/or enterprise resource planning systems. As used herein, the term "manufacturing systems" may also be referred to a s production engineering systems. Integration portals consistent with the present teachings provide an underlying architecture that bridges semantic gaps between manufacturing systems to facilitate collaboration based on relevant manufacturing objects from different source and target manufacturing systems.

Such an architecture may be used to bring in auxiliary data accompanying various bills of material (BOM), such as product & manufacturing information (PMI) and manufacturing process definition (MPD) data. Typically, PMI and MPD objects have no pre-defined semantics in connection with a particular ERP landscape but may be important in driving several processes associated with generating shop-floor routing definitions. For example: a product measurement dimension PMI may have an influence on various factors such as inspection characteristics of an operation activity. A surface finish PMI may influence a corresponding production resource or tools selected for an operation activity. MPD structure may drive a high-level skeleton definition of a particular shop-floor routing. Procedures in MPD may drive operation definitions associated with a shop-floor routing. Such integrations and mappings are not limited to one-to-one usages. For example, a weld specification from a particular manufacturing source system may turn into a "qualification requirement" for that particular type of weld and a "tool assignment" to execute that weld, in a particular target ERP system.

Existing integration solutions work on the assumption that a static mapping can be created between source and target objects that are being synchronized. This mapping is always a field-to-field copy of values from source to target object. This mapping is rigid and relies heavily on semantics being similar in source and target object with little flexibility. Systems consistent with the present teachings are independent of source and target semantics. The sending (source) system need not take into consideration how the data will be consumed by the receiving (target) system. So, in that sense, the source data format can entirely be "Sender Driven." From a user experience perspective, flexible configurations and customizations in the target system can transform this sender-driven data and make sense of the data for consumption in a target system considering the context in which the data will be used in the target. The same source data can also be used to drive definitions of several target objects. Further, changes to source objects can be easily incorporated in target objects with in-built change tracking, impact analysis and automated change propagation.

Operational Environment for Embodiments

FIG. 1 is a system diagram 100 illustrating facilitating source to target translation and synchronization of production details for manufacturing of one or more production articles consistent with the present teachings. Product integration portal (PIP) 102 is an application for receiving product lifecycle management (PLM) information and information from other sources regarding certain aspects of creating and performing quality control in connection with articles of manufacture.

Functionality provided in connection with PIP 102 includes customizing settings, apps, and integration tools that enable the use of external source information in connection with PEO shop floor routings. PIP 102 provides certain integration tools that may be used to import external files into one or more ERP systems. Several tables may be provided for customizing input mappings so that a user can define source file classes including mappings between source items associated with data files received from one or more external systems (such as a PLM system) and the target objects that are required to create a shop floor routing in an ERP system, such as a manufacturing for manufacturing and operations (PEO) system.

Within PIP 202, an application may be provided to monitor snapshots associated with an engineering and/or manufacturing app. Using such an app, a user can monitor snapshots of the type engineering and manufacturing for the materials being manufactured. The user may identify snapshots for which issues exist—for example, where a PIP data preparation or change record preparation failed. If necessary, a user may then trigger such a process again manually. The user may specify when a snapshot was created and view its key data such as header material, plant, alternative BOM, revision, and preparation statuses. On a details page, the app also may also display an associated change record.

In a corresponding change record details screen, the system may display engineering and manufacturing snapshots in the Snapshot section. If only an engineering snapshot is available and an engineering bill of materials (EBOM), the user may launch a feature to perform the EBOM to manufacturing bill of materials (MBOM) conversion. During this process, the system may also convert an engineering snapshot into a manufacturing snapshot in the background. The user may then select a manufacturing snapshot and trigger the creation of a shop floor routing directly from a change record.

Information provided in connection with PIP 102 may include unstructured and include various sources of information that provide information associated with change management and one or more change impact analyses. A first such source is product manufacturing information (PMI) 104. PMI 104 may include any information useful to manufacture a product, such as geometric or non-geometric data included within a two- or three-dimensional computer automated design (CAD) data source. Another source is assembly sequence 106, which provides information regarding one or more sequences of assembly used in connection with production and/or quality control with respect to an article of manufacture. A further source of information is process outline 108, which may provide information regarding how certain processes may be carried out in connection with production of an article of manufacture. Substance database 110 may be provided as well to provide information regarding one or more substances that may be used in connection with production of an article of manufacture. Additional information may also be consumed such as plant layout 112, which may contain information regarding a facility that may be used in connection with production of an article of manufacture.

Manufacturing and operations or production engineering operations (PEO) repository 114 provides information regarding manufacturing templates that may be used during a design phase of a production process. During the technical design phase, for example, an engineer may not work exclusively on an EBOM that contains individual components required to make an end product. As used herein, the term "technical design" may also be referred to as product engineering. An engineer engaged in design may also expend significant efforts in the creation of a three-dimensional visual, a drawing that does not only contain lists of components but also the dimensions and detailed instructions that are required to assemble the parts, or possibly process instructions. This information could include, for example: the size of a hole to be drilled, heating and/or cooling requirements for components, and welding instructions. Such information is required in a shop floor routing to facilitate the creation of a detailed production process. PIP 102 provides a user with tools to enable integration of engineering data from an external system to an ERP PEO and then to create a mapping between the source files and the corresponding PEO target objects which a production engineer can then consume directly in a routing to model an actual production process. Template operations 116 and template activities 118 are reusable building blocks for creating shop floor routings.

PEO routing 120 may provide functionality associated with design time activities for shop floor execution to produce an article of manufacture. In connection with certain operations established in PEO routing 120, such as operation 122, operation 124, and operation 126 interactive work instructions and consistency checks may be defined. Interactive work instructions may include embedded data collection, embedded standard textual descriptions, embedded tool usage tracking, BOM item instance links, three-dimensional view links, and document links to facilitate carrying out the operations. From PEO routing 102, order execution 128 are generated to enable actual production of articles of manufacture on a shop floor (or otherwise in a factory). In addition to order execution 128, PEO routing 120 may produce any number of additional outputs such as outputs 130. Outputs 130 may include BOM item instances, material masters, tool materials, inspection characteristics, standard textual descriptions, status and action schemes, reference designators, three-dimensional visuals, work centers, equipment descriptions, approvals, and purchase information records.

Figure 2:
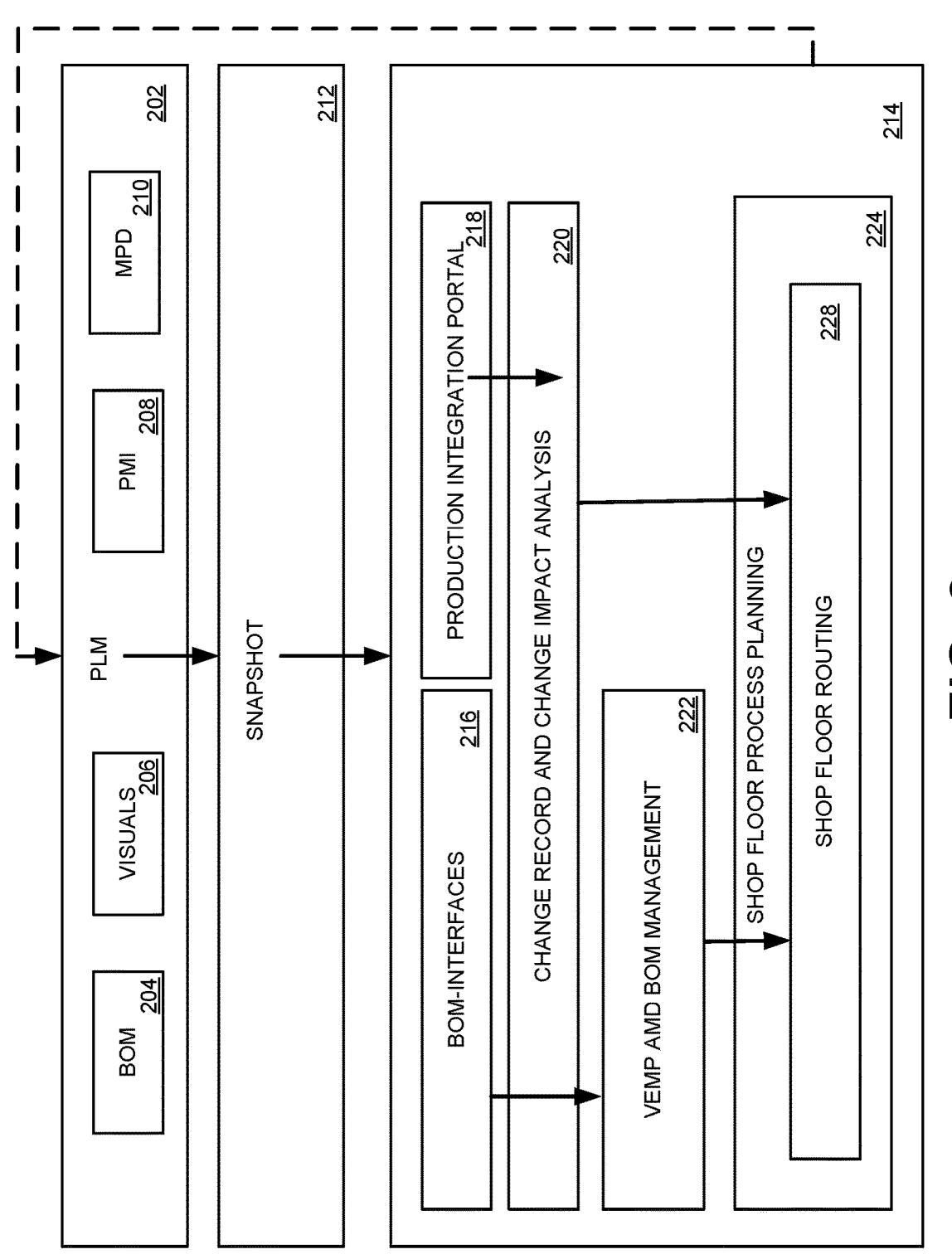
FIG. 2 is a diagram illustrating an example product lifecycle management and technical design and operations integration with a product integration portal.

FIG. 2 is a diagram 200 illustrating an example product lifecycle management and technical design and operations integration with a product integration portal. Product lifecycle management (PLM) application 202 contains various sources of product lifecycle information. A first source may include one or more bills of material (BOM) 204, BOM 204 may include one or more lists of components and associated quantities that may be used to produce an assembly or a finished article of manufacture. Other sources may include visuals 206, which may provide graphical renderings or photographs of an article of manufacture or one or more of its component assemblies. Further sources of information may include PMI 208 (similar to PMI 104 of FIG. 1) and/or MPD 210 which may include descriptions of manufacturing processes.

Snapshot 212 may contain a specific instances of product lifecycle management data values at a specific point in time.

Such snapshots may contain data related to engineering and manufacturing for the materials being manufactured. Further information may specify, for example, when a snapshot was created as well as related information, such as header material, plant, alternative BOM, revision, and preparation statuses. Snapshot values may be provided to application 214, which may be an ERP system that manages information for producing a specific article of manufacturing in connection with other data sources. Application 214 receives such information from BOM interfaces 216, which may be implemented as external BOM APIs such as SOAP-services, or OData-services to maintain BOMs in the ERP system. Further, application 214 receives information from PIP 214 which may be similar to PIM 102 of FIG. 1.

Change record and change impact analysis functionality 220 may receive information from snapshot 212 as well as from BOM interfaces 216 and PIP 218. Additionally, visual enterprise manufacture planner (VEMP) and BOM management 222 functionality may receive information from BOM interfaces 216 and be used to provide additional information to shop floor routing 228 as part of shop floor process planning 224. Shop floor routing 228 may also receive information from change record and change impact analysis functionality 220 to produce one or more shop floor routings to enable production of one or more articles of manufacture. As show in FIG. 2, output from application 214 may be fed back into PLM application 202.

Figure 3A:
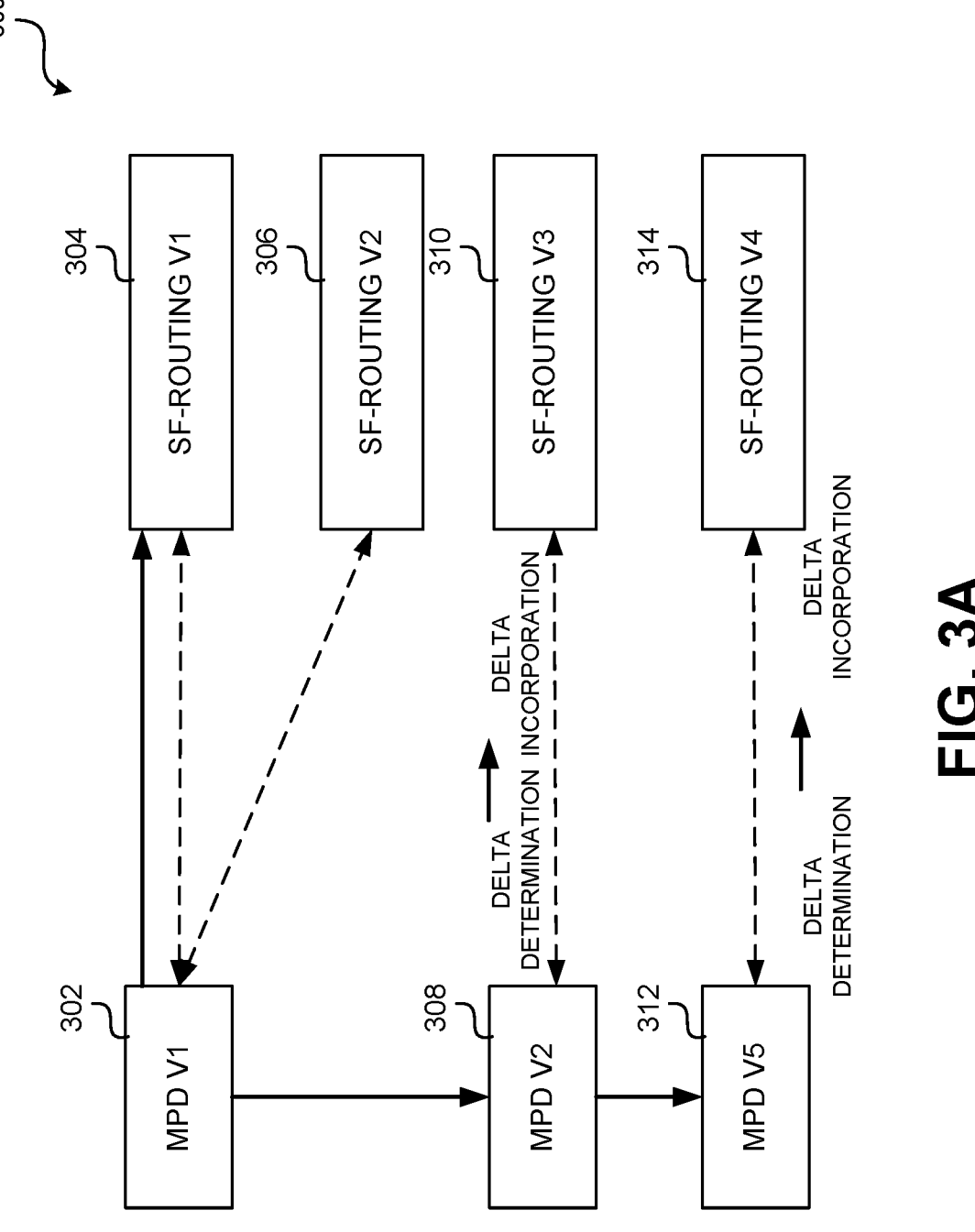
FIG. 3A shows an example change incorporation mechanism and version control process for handover of maintenance program definition to a plurality of technical design and operations routings.

FIG. 3A shows an example diagram 300 illustrating change incorporation mechanisms and version control processes for handover of maintenance program definition to a plurality of technical design and operations routings. Various principles may be taken into consideration when handing over MPD to PEO routing. The integrity of a particular shop floor routing should be ensured. The hand over should support different types of MPDs as the MPDs may differ depending on which PLM system is used and depending on the specific PLM system configuration. The system should support automated handover as well as manual handover as well as enhancements and adjustments in PEO. Running a change impact analysis on MPD changes should be allowed, before actually changing a shop floor routing.

Enhancements carried out in PEO may be kept when rolling forward to a new MPD version to update corresponding versions of descriptions of manufacturing processes. Changes carried out in PEO may not be automatically overwritten by a subsequent MPD version. In some embodiments, a user may be prompted to provide a decision regarding whether to overwrite changes. Routing versions may be rolled forward or backward without a corresponding roll of an associated MPD. In some embodiments, MPD versions may be skipped. In these embodiments, a shop floor routing may not be released unless corresponding relevant MPD changes have been incorporated.

Definition 302 denoted "MPD V1," which corresponds to a first version of MPD, may be used initially to generate routing 304, denoted "SF-ROUTING V1," which corresponds to a first shop floor routing. After this initial creation of routing 304, subsequent versions of a shop floor routing may be generated such as routing 306, denoted "SF-ROUTING V2," which may be based on information from definition 302 and additional information as described above. Definition 308 denoted "MPD V2," which corresponds to a second version of MPD, may be used initially to generate routing 310, denoted "SF-ROUTING V3," which corresponds to a third shop floor routing, based on a determination of deltas between the information used to produce the various versions of shop floor routings. First a delta determination is performed and then the delta is incorporated into the current shop floor routing (routing 310 in this case). A subsequent definition 312, "MPD V5," which corresponds to a fifth version of MPD, may be derived from definition 308 and be used via delta determination and delta incorporation to create routing 314, denoted "SF-ROUTING V4." In each of these cases, data from a particular shop floor routing may be returned to an MPD to provide updated information regarding the MPD and to potentially be used in connection with subsequent MPDs.

FIG. 3B shows an example user interface depiction 350 for implementing change management and change impact analysis for a product integration portal. A particular source file visualization 352 may be analyzed to determine an associated change impact from changes to the source file. One or more resulting shop floor routings may be visualized in connection with pane 358. Pane 356 may be used to display a three-dimensional visualization of an article of manufacture in a current version associated with source file visualization 352. Pane 354 displays information regarding one or more change records to detect the downstream objects (such as shop floor routings or production orders) that may be affected by a new snapshot revision. A user may also add affected objects to a particular change record, if desired, for example if such changes are not present in the source file or are otherwise unable to be automatically mapped. As displayed in pane 354, data associated with particular features are shown to be new, deleted, changed or unchanged. Through the change impact analysis functionality, a user can visualize which features have been added, deleted, or changed so as to see that updated mappings are correct and if desired to manually update values or mappings prior to handover to update a particular shop floor routing.

Figure 4:
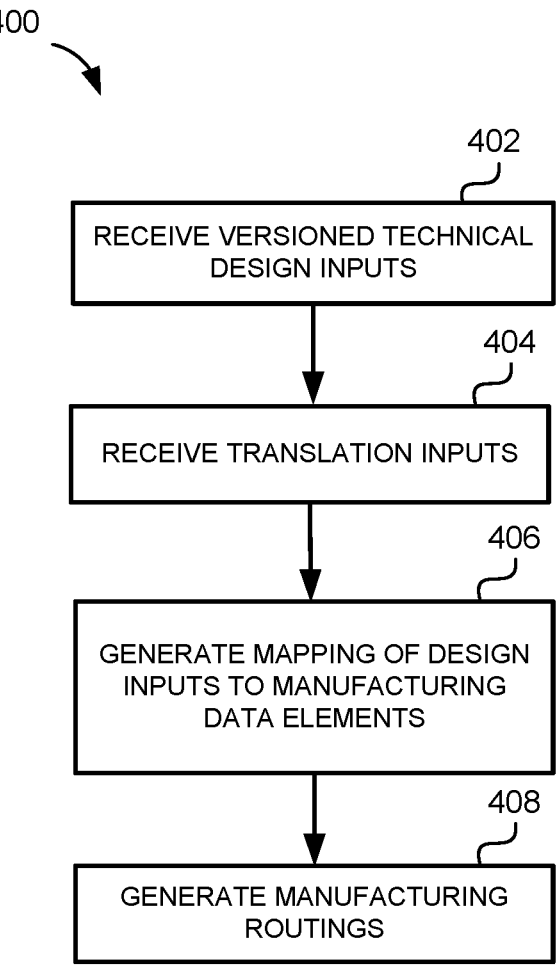
FIG. 4 is a flow diagram illustrating an example method for facilitating source to target translation and synchronization of production details for manufacturing of one or more production articles according to certain embodiments.

FIG. 4 is a flow diagram 400 illustrating an example method for facilitating source to target translation and synchronization of production details for manufacturing of one or more production articles according to certain embodiments. At step 402, a plurality of versioned technical design inputs are received in structured and unstructured formats. Next, at step 404, a plurality of translation inputs corresponding to one or more parameters associated with the plurality of versioned technical design inputs are received. Next at step 406, a mapping of the plurality of versioned technical design inputs to a plurality of manufacturing data elements associated with one or more data models of a manufacturing system may be automatically generated, based on the plurality of translation inputs. Next at step 408, a plurality of manufacturing routings may be generated for implementing production of the one or more production articles. In some embodiments, the plurality of versioned technical design inputs comprise at least one product manufacturing information data source. In some other embodiments, the unstructured formats comprise product manufacturing data formats including annotated assembly drawing files. In these embodiments, the plurality of translation inputs comprise categories associated with parameters in the annotated assembly drawing files. In certain embodiments, the plurality of manufacturing data elements comprise geometries associated with one or more physical dimensions of an article of manufacture. The plurality of manufacturing routings may comprise at least one three-dimensional additive or subtractive manufacturing operations. The plurality of manufacturing routings may comprise at least one specification corresponding to an order of operations to be performed in the production of one or more articles of manufacture.

Figure 5:
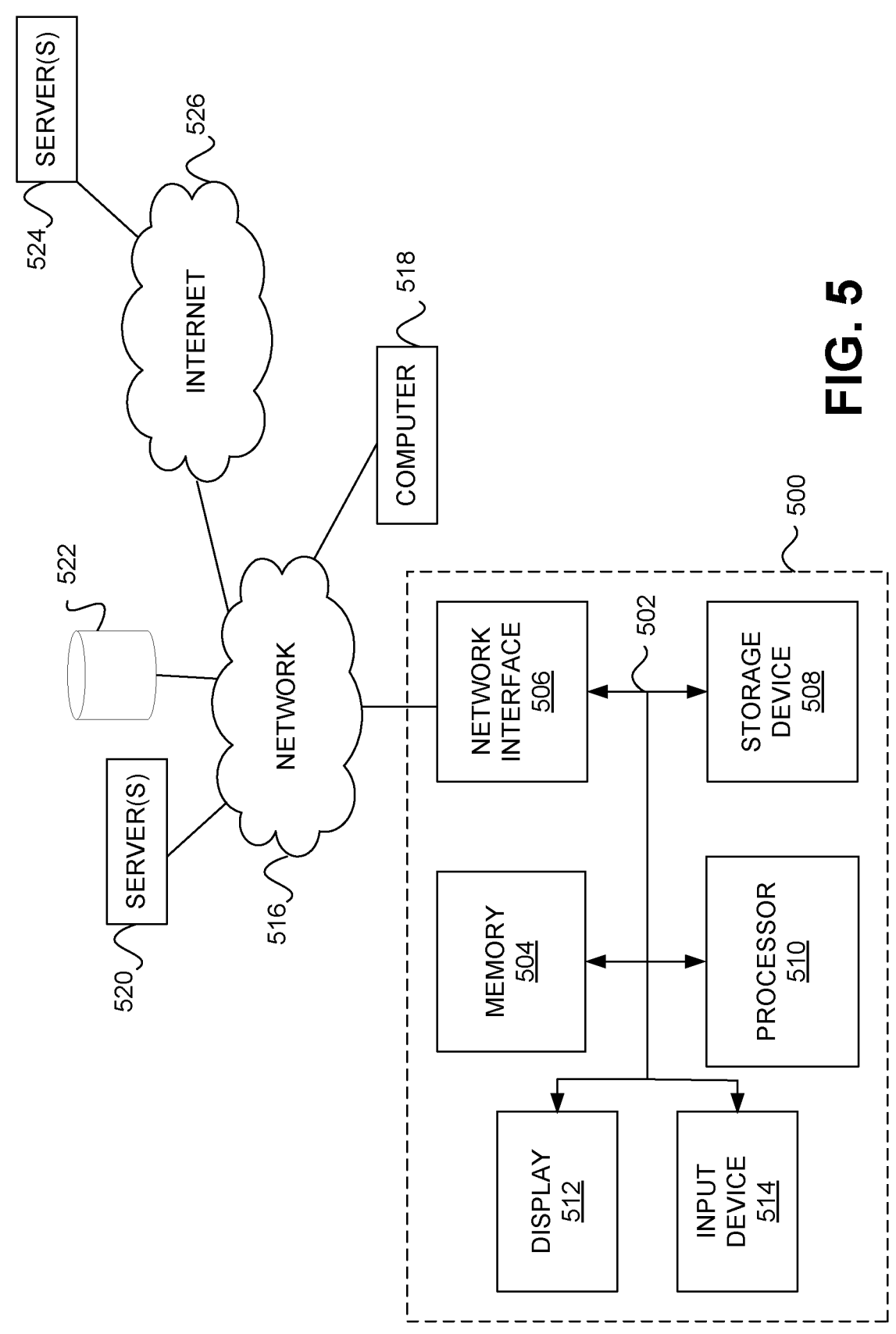
FIG. 5 is a diagram illustrating a sample computing device architecture for implementing various aspects described herein.

FIG. 5 is a diagram illustrating a sample computing device architecture for implementing various aspects described herein. Computer 500 can be a desktop computer, a laptop computer, a server computer, a mobile device such as a smartphone or tablet, or any other form factor of general- or special-purpose computing device containing at least one processor that may be employed to cause actions to be carried out. Depicted with computer 500 are several components, for illustrative purposes. Certain components may be arranged differently or be absent. Additional components may also be present. Included in computer 500 is system bus 502, via which other components of computer 500 can communicate with each other. In certain embodiments, there may be multiple busses or components may communicate with each other directly. Connected to system bus 502 is processor 510. Also attached to system bus 502 is memory 504. Also attached to system bus 502 is display 512. In some embodiments, a graphics card providing an input to display 512 may not be a physically separate card, but rather may be integrated into a motherboard or processor 510. The graphics card may have a separate graphics-processing unit (GPU), which can be used for graphics processing or for general purpose computing (GPGPU). The graphics card may contain GPU memory. In some embodiments no display is present, while in others it is integrated into computer 500. Similarly, peripherals such as input device 514 is connected to system bus 502. Like display 512, these peripherals may be integrated into computer 500 or absent. Also connected to system bus 502 is storage device 508, which may be any form of computer-readable media, such as non-transitory computer readable media, and may be internally installed in computer 500 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface 506 is also attached to system bus 502 and allows computer 500 to communicate over a network such as network 516. Network interface 506 can be any form of network interface known in the art, such as Ethernet, ATM, fiber, Bluetooth, or Wi-Fi (i.e., the Institute of Electrical and Electronics Engineers (IEEE) 802.11 family of standards). Network interface 506 connects computer 500 to network 516, which may also include one or more other computers, such as computer 518, server(s) 520, and network storage, such as cloud network storage 522. Network 516 is in turn connected to public Internet 526, which connects many networks globally. In some embodiments, computer 500 can itself be directly connected to public Internet 526 as well as one or more server(s) 524.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, for example as would a processor cache or other random-access memory associated with one or more physical processor cores.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims. Although the invention has been described with reference to the embodiments illustrated in the attached drawing figures, it is noted that equivalents may be employed, and substitutions made herein without departing from the scope of the invention as recited in the claims. The subject matter of the present disclosure is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the present claims. Terms should not be interpreted as implying any particular ordering of various steps described unless the order of individual steps is explicitly described.

The following detailed description of embodiments references the accompanying drawings that illustrate specific embodiments in which the present teachings can be practiced. The described embodiments are intended to illustrate aspects of the disclosed invention in sufficient detail to enable those skilled in the art to practice the invention. Other embodiments can be utilized, and changes can be made without departing from the claimed scope of the invention. The following detailed description is, therefore, not to be taken in a limiting sense. The scope of embodiments is defined only by the appended claims, along with the full scope of equivalents to which such claims are entitled.

Having thus described various embodiments of the invention, what is claimed as new and desired to be protected by Letters Patent includes the following:

The invention claimed is:

1. One or more non-transitory computer-readable media storing computer-executable instructions that, when executed by a processor, perform a method for control of manufacturing of one or more production articles by facilitating source to target translation and synchronization of production details for manufacturing of the one or more production articles, the method comprising:

receiving a plurality of versioned technical design inputs in structured and unstructured formats, the plurality of versioned technical design inputs for the manufacturing of the one or more production articles;

receiving a plurality of translation inputs corresponding to one or more parameters associated with the plurality of versioned technical design inputs;

automatically generating, via a data model-based translator module, a mapping of the plurality of versioned technical design inputs to a plurality of manufacturing data elements of a manufacturing system, each manufacturing data element corresponding to a respective data-model instance in the manufacturing system, and based on the plurality of translation inputs; and generating, in the manufacturing system, a plurality of manufacturing routings for implementing production of the one or more production articles, wherein each manufacturing routing is aligned with data-model instances to provide synchronized production detail translation between the design inputs and the manufacturing system;

maintaining the mapping and the manufacturing routings in versioned form;

monitoring changes to any of the versioned technical design inputs, and in response to detecting a design change, propagating an update through the mapping to the manufacturing data elements and automatically updating an affected manufacturing routings so as to synchronize the design change with the manufacturing system.

2. The non-transitory computer-readable media of claim 1, wherein the plurality of versioned technical design inputs comprise at least one product manufacturing information data source.

3. The non-transitory computer-readable media of claim 1, wherein the unstructured formats comprise product manufacturing data formats including annotated assembly drawing files.

4. The non-transitory computer-readable media of claim 3, wherein the plurality of translation inputs comprise categories associated with parameters in the annotated assembly drawing files.

5. The non-transitory computer-readable media of claim 1, wherein the plurality of manufacturing data elements comprise geometries associated with one or more physical dimensions of an article of manufacture.

6. The non-transitory computer-readable media of claim 1, wherein the plurality of manufacturing routings comprise at least one three-dimensional additive or subtractive manufacturing operations.

7. The non-transitory computer-readable media of claim 1, wherein the plurality of manufacturing routings comprise at least one order of operations.

8. A method for control of manufacturing of one or more production articles by facilitating source to target translation and synchronization of production details for manufacturing of one or more production articles, the method comprising:

receiving a plurality of versioned technical design inputs in structured and unstructured formats, the plurality of versioned technical design inputs for the manufacturing of the one or more production articles;

receiving a plurality of translation inputs corresponding to one or more parameters associated with the plurality of versioned technical design inputs;

automatically generating, via a data model-based translator module, a mapping of the plurality of versioned technical design inputs to a plurality of manufacturing data elements of a manufacturing system, each manufacturing data element corresponding to a respective data-model instance in the manufacturing system, and based on the plurality of translation inputs; and generating, in the manufacturing system, a plurality of manufacturing routings for implementing production of the one or more production articles, wherein each manufacturing routing is aligned with data-model instances to provide synchronized production detail translation between the design inputs and the manufacturing system;

maintaining the mapping and the manufacturing routings in versioned form;

monitoring changes to any of the versioned technical design inputs, and in response to detecting a design change, propagating an update through the mapping to the manufacturing data elements and automatically updating an affected manufacturing routings so as to synchronize the design change with the manufacturing system.

9. The method of claim 8, wherein the plurality of versioned technical design inputs comprise at least one product manufacturing information data source.

10. The method of claim 8, wherein the unstructured formats comprise product manufacturing data formats including annotated assembly drawing files.

11. The method of claim 10, wherein the plurality of translation inputs comprise categories associated with parameters in the annotated assembly drawing files.

12. The method of claim 8, wherein the plurality of manufacturing data elements comprise geometries associated with one or more physical dimensions of an article of manufacture.

13. The method of claim 10, wherein the plurality of manufacturing routings comprise at least one three-dimensional additive or subtractive manufacturing operations.

14. The method of claim 8, wherein the plurality of manufacturing routings comprise at least one order of operations.

15. A system for control of manufacturing of one or more production articles by facilitating source to target translation and synchronization of production details for manufacturing of one or more production articles, the system comprising:

at least one processor;

and at least one non-transitory memory storing computer executable instructions that when executed by the at least one processor cause the system to carry out actions comprising:

receiving a plurality of versioned technical design inputs in structured and unstructured formats, the plurality of versioned technical design inputs for the manufacturing of the one or more production articles;

receiving a plurality of translation inputs corresponding to one or more parameters associated with the plurality of versioned technical design inputs;

automatically generating, via a data model-based translator module, a mapping of the plurality of versioned technical design inputs to a plurality of manufacturing data elements of a manufacturing system, each manufacturing data element corresponding to a respective data-model instance in the manufacturing system, and based on the plurality of translation inputs; and generating, in the manufacturing system, a plurality of manufacturing routings for implementing production of the one or more production articles, wherein each manufacturing routing is aligned with data-model instances to provide synchronized production detail translation between the design inputs and the manufacturing system;

maintaining the mapping and the manufacturing routings in versioned form;

monitoring changes to any of the versioned technical design inputs, and in response to detecting a design change, propagating an update through the mapping to the manufacturing data elements and automatically updating an affected manufacturing routings so as to synchronize the design change with the manufacturing system.

16. The system of claim 15, wherein the plurality of versioned technical design inputs comprise at least one product manufacturing information data source.

17. The system of claim 15, wherein the unstructured formats comprise product manufacturing data formats including annotated assembly drawing files.

18. The system of claim 17, wherein the plurality of translation inputs comprise categories associated with parameters in the annotated assembly drawing files.

19. The system of claim 15, wherein the plurality of manufacturing data elements comprise geometries associated with one or more physical dimensions of an article of manufacture.

20. The system of claim 17, wherein the plurality of manufacturing routings comprise at least one three-dimensional additive or subtractive manufacturing operations.

* * * * *